United States Patent [19]

Hendrischk

[11] 4,382,704
[45] May 10, 1983

[54] FRICTION DRIVE IN PRINTERS

[75] Inventor: Wolfgang Hendrischk, Neu-Ulm, Fed. Rep. of Germany

[73] Assignee: Mannesmann Aktiengesellschaft, Dusseldorf, Fed. Rep. of Germany

[21] Appl. No.: 871,459

[22] Filed: Jan. 23, 1978

[30] Foreign Application Priority Data

Jan. 25, 1977 [DE] Fed. Rep. of Germany ....... 2703345

[51] Int. Cl.³ ............................................. B41J 11/50
[52] U.S. Cl. ................................. 400/585; 400/585.1; 400/607.3
[58] Field of Search ............................ 400/584–585.1, 400/605–607, 607.3, 583; 101/93; 112/79

[56] References Cited

U.S. PATENT DOCUMENTS

| | | | |
|---|---|---|---|
| 2,107,128 | 2/1938 | Reingruber | 400/583 |
| 2,213,552 | 9/1940 | Scharr | 400/585.1 |
| 3,103,903 | 9/1963 | Broadrick | 400/585 |

Primary Examiner—Edward M. Coven
Attorney, Agent, or Firm—Ralf H. Siegemund

[57] ABSTRACT

A printer is provided with a single drive shaft mounted on plural bearings and carrying a plurality of axially aligned, individually rotatable, hollow friction rolls, each containing an electromagnetic brake and a coupling for connecting the roll to the shaft. The electromagnets are operated independently for the several rolls and feelers are disposed upstream of the paper webs to operate the brake when sensing a marking or the end of a roll of paper separately for each roll.

2 Claims, 2 Drawing Figures

FRICTION DRIVE IN PRINTERS

BACKGROUND OF THE INVENTION

The present invention relates to friction drive and sheet advancing means which includes plural friction rolls and is used in printers.

Printers are, for example, constructed in that a friction roll advances a sheet or the current end portion of a roll of paper or other web material onto a platen, and a print head is moved across to print a line. Thereafter, the paper is advanced by whatever distance is deemed appropriate for printing the next line. In some cases, a single print head serves and services two different sheets which are advanced independently by individual friction rolls. Individual sheets are cut from each roll, such as individual tickets.

The friction rolls of these known printers are axially aligned therein. One roll is usually being driven from one side and the other roll is driven from the other side. Printers of the type with several friction driven rolls, but also those with an individual friction roll, often operate with paper having certain information already printed on, and the printer merely supplements the printed content and information. A friction drive here has the disadvantage that a certain amount of slip is inevitable so that the newly printed matter may not be very accurately registered with the preprinted information. Thus, one needs to make certain adjustments to compensate such slippage which may be cumulative, otherwise such adjustment may be aided by markings which are scanned.

DESCRIPTION OF THE INVENTION

It is an object of the present invention to provide a new and improved friction drive in printers permitting any number of friction rolls to be driven for independent advance of a corresponding number of sheets or webs to be printed on.

It is a specific object of the invention to provide for a constuction of such a friction drive which permits ready exchange of the rolls including a changeover to differently dimensioned rolls pursuant to such an exchange or replacement.

It is another object of the present invention to improve the paper transport in printers with regard to friction slip and misalignment.

In accordance with the preferred embodiment of the invention, it is suggested to provide a common or single shaft and a plurality of axially aligned, individually rotatable, hollow friction rolls are disposed on the shaft. The shaft is driven from one side and each roll contains an electromagnetic clutch or coupling for connecting the rolls to the shaft; each roll contains additionally an electromagnetic brake. The shaft is mounted in plural bearings being disposed to both sides of each roll, whereby the bearing mounts support also the stationary parts of the brakes as well as the electromagnets for the couplings. The electromagnets are operated independently for the several rolls whereby preferably feeler means are disposed upstream of the paper webs, sheets, etc., to monitor, e.g. markings and, possibly, the end of the respective sheet to stop the respective friction roll.

It can thus be seen that a single drive shaft can be made to advance independently several sheets or webs to be printed on. Each friction roll is driven and can be stopped independently. On the other hand, the rolls can be exchanged, e.g. for longer ones. Moreover, manufacturing is greatly facilitated for reasons of commonality of many components as far as printers with differently long rolls and different numbers of sheets are concerned.

For reasons of interchangeability, the brake should always be disposed near one axial end, and the clutch near the other one, and in the same fashion for all rolls. The stationary inserts for brake and clutch should be made independent from the length of the respective roll. The scan control on the basis of markings prevents the formation of cumulative slip errors so that each new print task (sheet, ticket, etc.) begins from a newly established position. The location for sensing the markings is disposed upstream as to the particular web or sheet, and this location of the sensor with respect to (distance) to a cutter can be changed to change the location of cutting on a sheet or to change the length thereof, such as the length of a ticket.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 shows three axially aligned friction rolls 1, 2 and 3, being of hollow construction and of equal axial length. Generally speaking, these rolls are similarly constructed and can, actually, exchange places among each other. The three rolls are traversed by a single common shaft 4, carrying on one end a drive gear 5. The gear is being driven by a toothed belt which, in turn, is driven by a suitable motor. All these components are contained in a case or housing 7.

Figure 1:
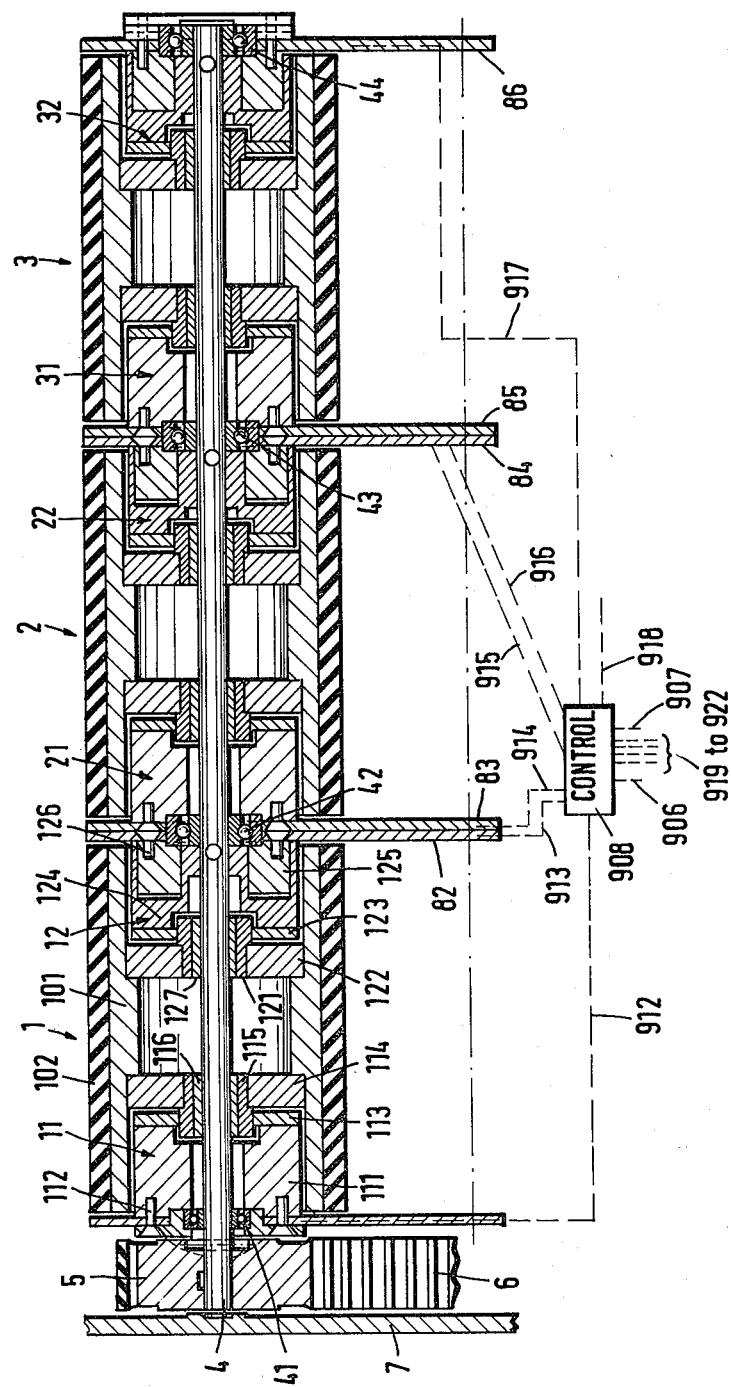
FIG. 1 is a section view through a drive in accordance with an example of the preferred embodiment of the invention, using three axially aligned friction rolls.

The shaft 4 is journalled in bearings 41, 42, 43, 44, being disposed so that a pair of bearings is provided for, respectively, at the axial ends of each roll whereby, however, rolls 1 and 2 share bearings 42 and rolls 2 and 3 share bearings 43. The bearings 41 to 44 journal the shaft 4 in support sheets 81 through 86, whereby sheets 82, 83, and sheets 84, 85 are juxtaposed or even joined, at least they carry the respectively shared bearings. The sheets 82, 83, 84 and 85 are removably or releasably fastened to the case for purposes of permitting an exchange of the friction rolls and replacement, for example, of the three rolls by a single one. As so disposed, the sheets become parts of the housing or case structure. For ease of such installation, sheets 81 and 86 could also be removable. However, it can readily be seen that bearings 41 and 44, as respectively mounted on sheets 81 and 86, will always be provided to support and journal the shaft 4 at its ends. The intermediate sheets and bearings are provided as needed. If only two friction rolls are needed, being e.g. axially longer, or at least one is longer, one intermediate bearing with two support sheets only is needed and installed in case 7.

Next, I turn to details of the friction rolls; as stated, they are similarly constructed so that description of one roll suffices. The roll 1 is comprised of a hollow cylindrical body 101 carrying a friction lining or jacket 102. The interior of body 101 contains a brake 11 and a clutch or coupling 12. Brake 11 includes a stationary annular part 111 which is secured to sheet 81 by means of bolts 112. Part 111 contains an electromagnet which is not specifically identified but 111 constitutes the yoke of that electromagnet.

The electromagnet of 111, when activated, will attract and hold a disk 113. This disk 113 is mounted on a bushing 115 in such a manner that the disk 113 can undergo limited axial displacement and will follow rotation of sleeve 115. Sleeve 115 is secured to body 101 by means of a support disk 114. In addition, bushing 115 sits on and is connected to a roller bearing type bushing 116 which may roll on shaft 4. Thus, assembly 113, 114, 115 and 116 is connected to the body 101 and rotates therewith, but disk 113 is axially displaceable and may engage stationary part 111, and thus hold the body 101. When so held, sleeve 116 rolls on the continuously rotating shaft 4.

The roller body 101 is basically of symmetrical construction and accordingly, a support disk 122 is secured more to the other side which disk, in turn, is secured to a sleeve 121. The sleeve 121 is carried by a roller bearing bushing 127 which may roll on shaft 4. Moreover, sleeve 121 carries an axially displaceable coupling disk 123 which, however, is keyed to the sleeve 121 to follow any rotation thereof. Disk 123 is the secondary or driven output of clutch or coupling 12.

An annular magnet 125 is bolted to sheet 82 by means of bolts 126. The clutch 12 includes a primary member 124 which is secured to the shaft 4. Upon energizing the magnet 125 disk 123 is attracted to member 124, and since disk 123 is connected to body 101, roll 1 is compelled to follow the rotation of the shaft.

It should be noted that the sheets such as 81 and 82 (or 83 and 84, etc.) carry subassemblies, i.e. electromagnets which are being inserted into the respective roller bodies. The roller bodies, in turn, carry internal subassemblies in form of sleeves which may roll on the shaft but carry disks, such as 113 and 123, which cooperate with the respective electromagnets to obtain braking or driving connection as the case may be. Only one element, namely primary clutch part 124, per roll is secured to the drive shaft 4.

Reference numeral 912 and 913 refer to conductors which provide energizing voltages, respectively, to the magnet in member 111 and to the magnet 125. The rolls 2 and 3 are constructed analogously, each containing a brake and a coupling, and reference numerals 914, 915, 916 and 917 refer to conductors for running voltages to the electromagnetic components in these other rolls. These conductors run through the several sheets 81 etc., as they support the electromagnets. All conductors connect to a controller 908 which provides the requisite energizing signals and particularly controls timing thereof for selectively coupling rolls to the continuously driven shaft or for providing for roll braking to hold one or the other, some or all rolls in stationary positions. Controlling 908 also times the printer (line 918) to the stationary paper positions.

Figure 2:
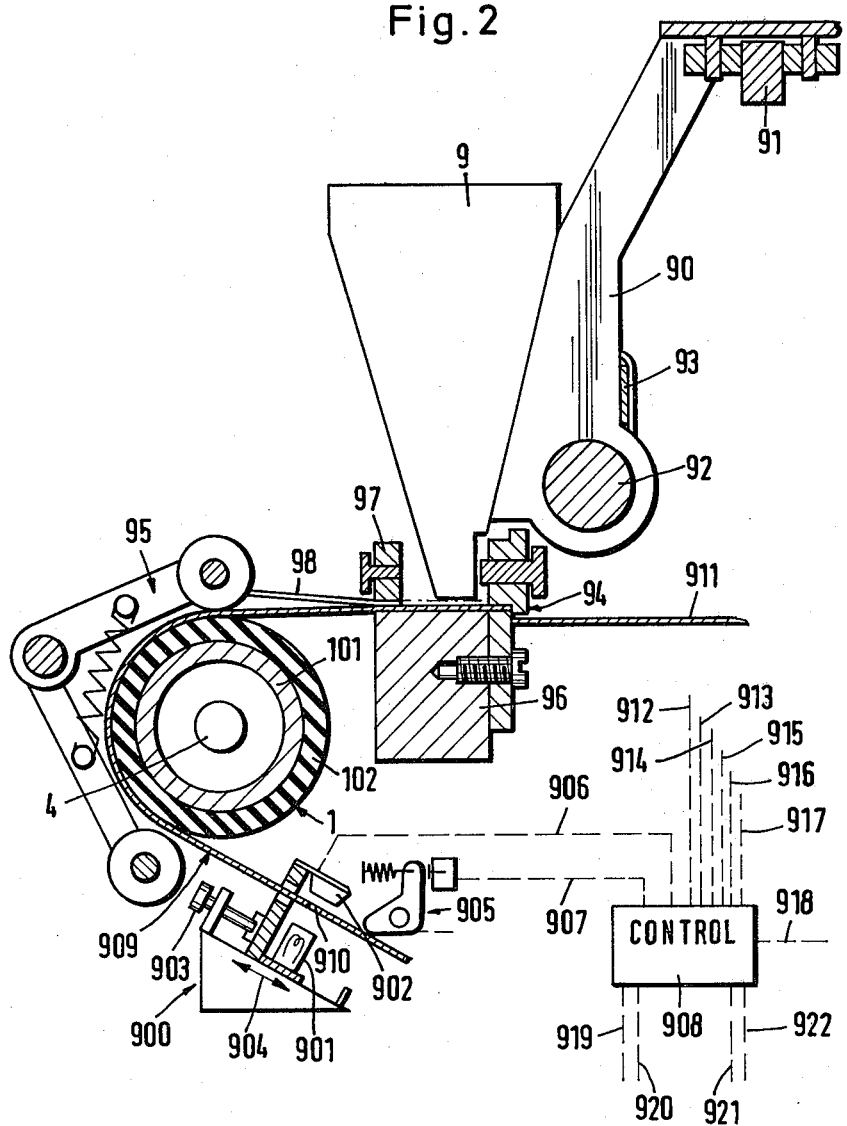
FIG. 2 is a schematic section view through a portion of a ticket printer, showing one of the rolls as shown in FIG. 1 and in a section plane transversely to the plane of the drawing in FIG. 1.

Turning now to FIG. 2, this figure shows a print head 9 constructed as needle printer, i.e. the head contains plural printing needles which have their tips aligned in a plane parallel to the plane of the drawing and are individually energized for advancing to obtain printing of a single dot. The combination of advances and restraint from advances permits composition of alpha numerical characters and other symbols.

The print head 9 is mounted to a carriage 90 which slides on a round bar 92; the carriage additionally has a set of wheels which run on a stationary rail 91. A belt 93 is affixed to carriage 90 for pulling the carriage across the rail/bar assembly 91/92, transversely to the plane of the drawing of FIG. 2.

Reference numeral 909 refers to a sheet or roll of paper held by means of a press roll 97 upon a printing platen 96. Particularly, the roll 97 urges a flexible sheet 98 towards the paper and the platen 96. A cutter 94 permits cutting off a portion 911 on which one may have previously printed; 911 may be a ticket. A cutter which is suitable for this prupose is shown, for example, in my copending U.S. Pat. No. 4,152,962.

FIG. 2 shows also one of the rolls, e.g. friction roll 1, and sheet or web 909 is wrapped partially around the roll and is urged against a considerable portion of the periphery of lining 102 of roll 1 by means of pressure rolls of a resiliently biased device 95. The paper may be provided with markings, such as holes 910 in the center of the sheet being spaced at particularly distance from each other along a center line. The spacing may be provided commensurate with the desired sheet length, such as the length of a ticket.

A scanner 900 is provided to detect the holes as they pass. The scanner includes a detector 902 which is aligned with a light source 901 across the sheet 909 at a location even upstream from the friction roll 1. Elements 901, 902 are mounted on a carriage which is adjustably mounted on a bed 904 for movement in accordance with the double arrow. The carriage is particularly adjusted by means of a spindle 903.

The adjustment establishes a particular distance of the detector location from the cutting edge and determines, therefore, the phase of cutting relative to the hole pattern. The adjustment may be such that cutter 94 cuts always through the center of the holes, so that the said distance is equal to or an integral multiple of the hole spacing. Since the advance of the web or sheet for printing a new ticket or document will always be phased in relation to the detection of a hole, the line-by-line printing process is adjusted anew in relation to the print sheet on the basis of these holes. If the sheet carries pre-printed information, that information is particularly spaced and oriented to the hole pattern. Thus, any transport and slip errors in the advance of the sheet by means of the friction drive is not cumulative from ticket-to-ticket or document-to-document.

The photo detector 902 is connected by means of a signal line 906 to the control 908. A feeler arm 905 is spring-biased against the paper 909 and signals into a line 907 as soon as the end of the roll of paper 909 has passed. Turning for the moment back to FIG. 1, such hole detectors and end-of-paper monitoring devices are also provided for the other rolls, 2 and 3, and appropriate signal lines 919 to 922 are provided accordingly.

As far as operation is concerned, it may be assumed that magnet 125 is energized to couple roll 1 to driver shaft 4 so that the friction roll advances the paper. As soon as detector 902 receives light from source 901 through a hole 901, clutch 12 is de-energized by controller 908 and brake 11 is activated instead. Roller 1 stops and the paper is held in a particular print-end position. This may complete a prior printing operation, and the head 9 may move across the sheet so that the cutter cuts a portion off the sheet.

Printing of the next ticket or document may now begin at any time. For this, head 9 is moved across the paper to print the first line. Following that controller 908 will temporarily release brake 11 and activate clutch 12 temporarily to advance the sheet by one or several line spacing or in accordance with a more complex spacing program. Thereafter, controller 908 deactivates clutch 12 and activates the brake 11, and another line can be printed. After the ticket has been printed, the termination of the print program causes the controller 908 to activate the clutch 12 again and the sheet will advance until the next hole has been detected by the scanner so that the friction drive is stopped again. Head 9 will run across one more time with activated cutter, whereupon this operation stops. It will be appreciated that in the meantime an entirely different printing program may have been carried out or may now be carried out on the sheet or sheets as advanced by the other rolls.

The invention is not limited to the embodiments described above but all changes and modifications thereof not constituting departures from the spirit and scope of the invention are intended to be included.

I claim:

1. In a printer having a case, a friction advance for a plurality of sheets or webs to be printed on, the friction advance providing for positioning of the sheets or webs for positioning of the sheets into particular printing positions, the combination comprising:
a plurality of support sheets, spaced side by side, at least some carrying bearings;
a shaft mounted in the bearings;
a plurality of electromagnet means respectively mounted on the support sheets and extending therefrom;
a plurality of hollow friction rolls; a brake means, and a secondary clutch member in each of the friction rolls, the friction rolls being mounted between the support sheets, and respective two of the plurality of electromagnet means extend into one of the rolls for respective operative connection to and cooperation with the brake means and the secondary clutch member therein, the secondary clutch member and the brake means in one of the rolls being also journalled on the shaft; and
primary clutch members secured to the shaft for respective cooperation with the secondary clutch members and the associated electromagnet means of the plurality.

2. In a printer as in claim 1, wherein any two of the support sheets as disposed between any two of the rolls carries a single one of the bearings.

* * * * *